J. BJORNLIE.
TIRE TOOL.
APPLICATION FILED MAR. 13, 1918.

1,305,337.

Patented June 3, 1919.
3 SHEETS—SHEET 1.

Witnesses
E. C. Wells
H. L. Ripley

Inventor
Julius Bjornlie
By his Attorneys
Williamson Michael

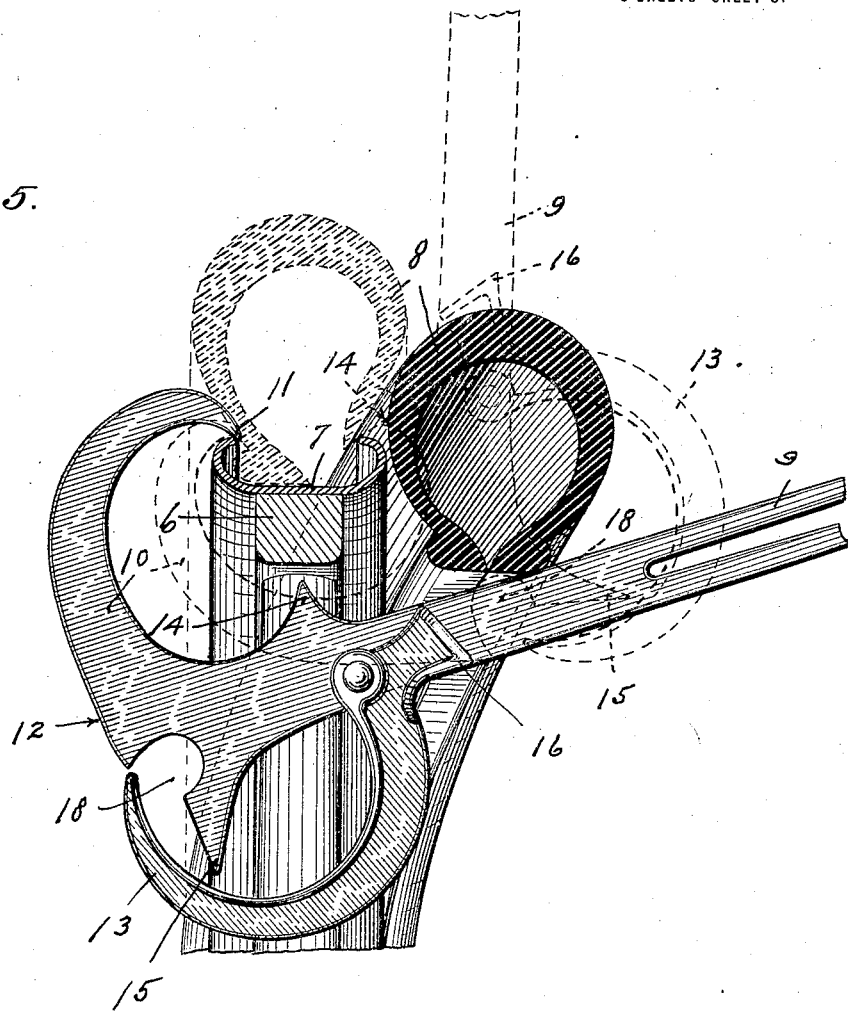

UNITED STATES PATENT OFFICE.

JULIUS BJORNLIE, OF WATERTOWN, SOUTH DAKOTA, ASSIGNOR OF ONE-HALF TO THORWALD BJORNLIE, OF MADISON, MINNESOTA.

TIRE-TOOL.

1,305,337.　　　　　Specification of Letters Patent.　　Patented June 3, 1919.

Application filed March 13, 1918. Serial No. 222,169.

*To all whom it may concern:*

Be it known that I, JULIUS BJORNLIE, a citizen of the United States, residing at Watertown, in the county of Codington and State of South Dakota, have invented certain new and useful Improvements in Tire-Tools; and I do hereby declare the following to be a full, clear, and exact description of the invention, such as will enable others skilled in the art to which it appertains to make and use the same.

My present invention has for its object to provide an extremely simple and convenient tool for use in applying pneumatic tire casings to wheel rims and in the removal of the same therefrom, and is in the nature of an improvement in my co-pending application, "tire tool", filed November 26, 1917, under Serial Number 204,059.

To the above end, the invention consists of the novel devices and combinations of devices hereinafter described and defined in the claim.

In the accompanying drawings, which illustrate the invention, like characters indicate like parts throughout the several views.

Referring to the drawings:

Fig. 5 is a view corresponding to Figs. 3 and 4, but illustrating the improved tool as used in replacing the tire casing on the wheel rim.

Figure 1:
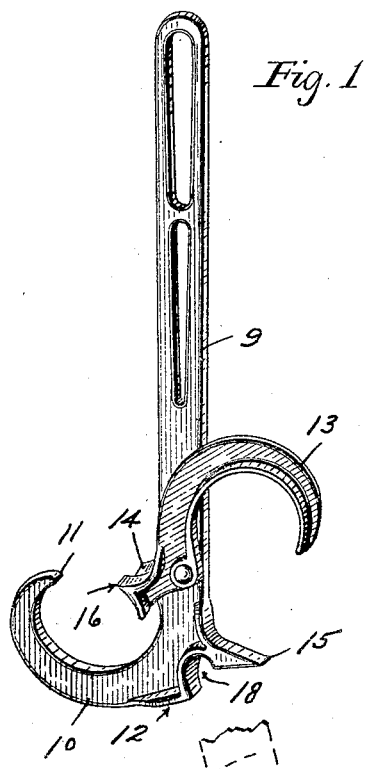
Figures 1 and 2 are perspective views of the improved tire tool.
Figure 2:
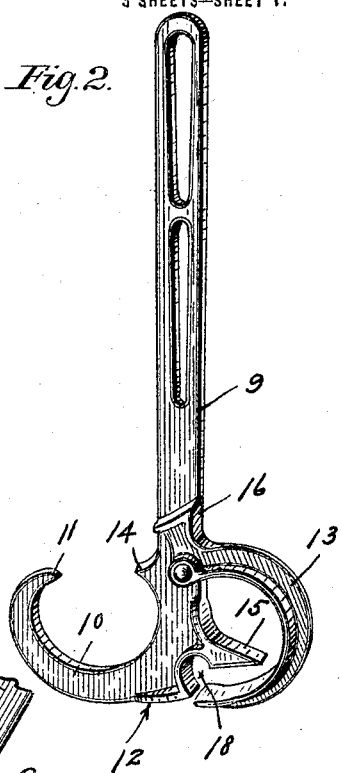

The numeral 6 indicates a wheel felly having secured thereto a wheel rim 7, on which is mounted a tire casing 8, of the clencher type. The improved tire tool comprises a lever 9, in the form of a flat bar having, integral with its inner end, an arm 10, located in the plane of the flat dimension of said lever. This arm 10 is curved, with its free end extending toward the outer end of the lever 9 and abruptly bent inward toward said lever, to afford a wheel rim-engaging member 11. The outer edge portion of the arm 10, adjacent to the lever 9 affords a shifting fulcrum 12 for engagement with the wheel felly and rim. This fulcrum 12 may be covered with a pliable substance, such as leather, to prevent marring of the parts engaged thereby.

Figure 3:
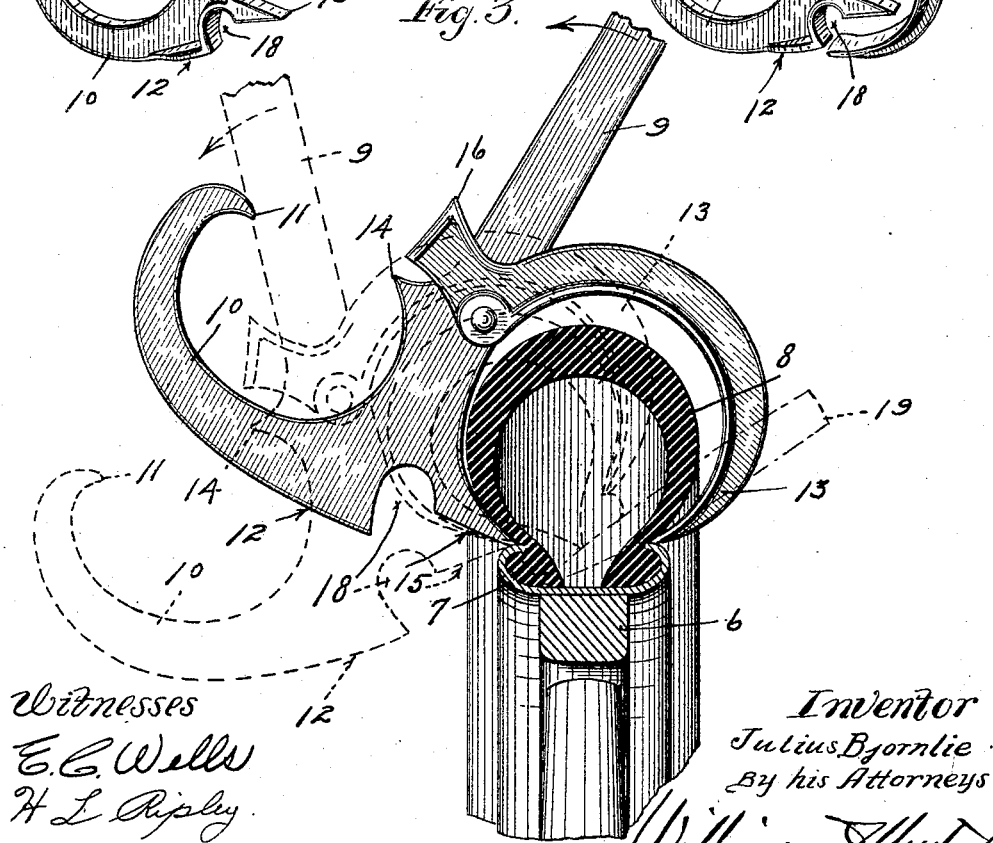
Fig. 3 is a fragmentary view partly in side elevation and partly in section, illustrating the improved tool in different positions by means of full and broken lines, as used in removing a tire casing from a wheel rim.

A movable grapple 13 is pivoted to the lever 9, at one side thereof, for swinging movement on the opposite edge of said lever from the arm 10. It will be noted that the free ends of the arm 10 and grapple 13 extend in opposite directions, and, together with the intervening portions of the lever 9, have a substantially S-shaped formation. The free end of the movable grapple 13 is chisel-shape, offset in the plane of the lever 9, and arranged to circumferentially engage a tire, as shown in Fig. 3.

Coöperating with the arm 10, is a tire-engaging shoulder 14, and coöperating with the movable grapple 13, is a prying finger 15, which also affords a fulcrum for the lever 9, as will presently appear. The tire-engaging shoulder 14 is integral with the edge of the lever 9, on which the arm 10 is located, and is positioned directly opposite the rim-engaging member 11. The finger 15 is integral with the edge of the lever 9, from which the movable grapple 13 projects, and is located inward of the fulcrum surface 12 with its free end projecting toward the free end of the movable grapple 13, when positioned as shown in Fig. 3.

The tire-engaging shoulder 14 is for use in connection with relatively large tires, and to adapt the same tool for use in connection with relatively small tires, there is formed, integral with the movable grapple 13, a supplemental tire-engaging shoulder 16. This shoulder 16, when the movable grapple 13 is set, as shown in Fig. 1, forms an extension of the shoulder 14 and decreases the difference between the shoulder 16 and rim-engaging member 11. A stop lug on the movable grapple 13 engages the lever 9 when said grapple is set, as shown in Fig. 1, and properly positions the supplemental tire-engaging shoulder 16.

Figure 4:
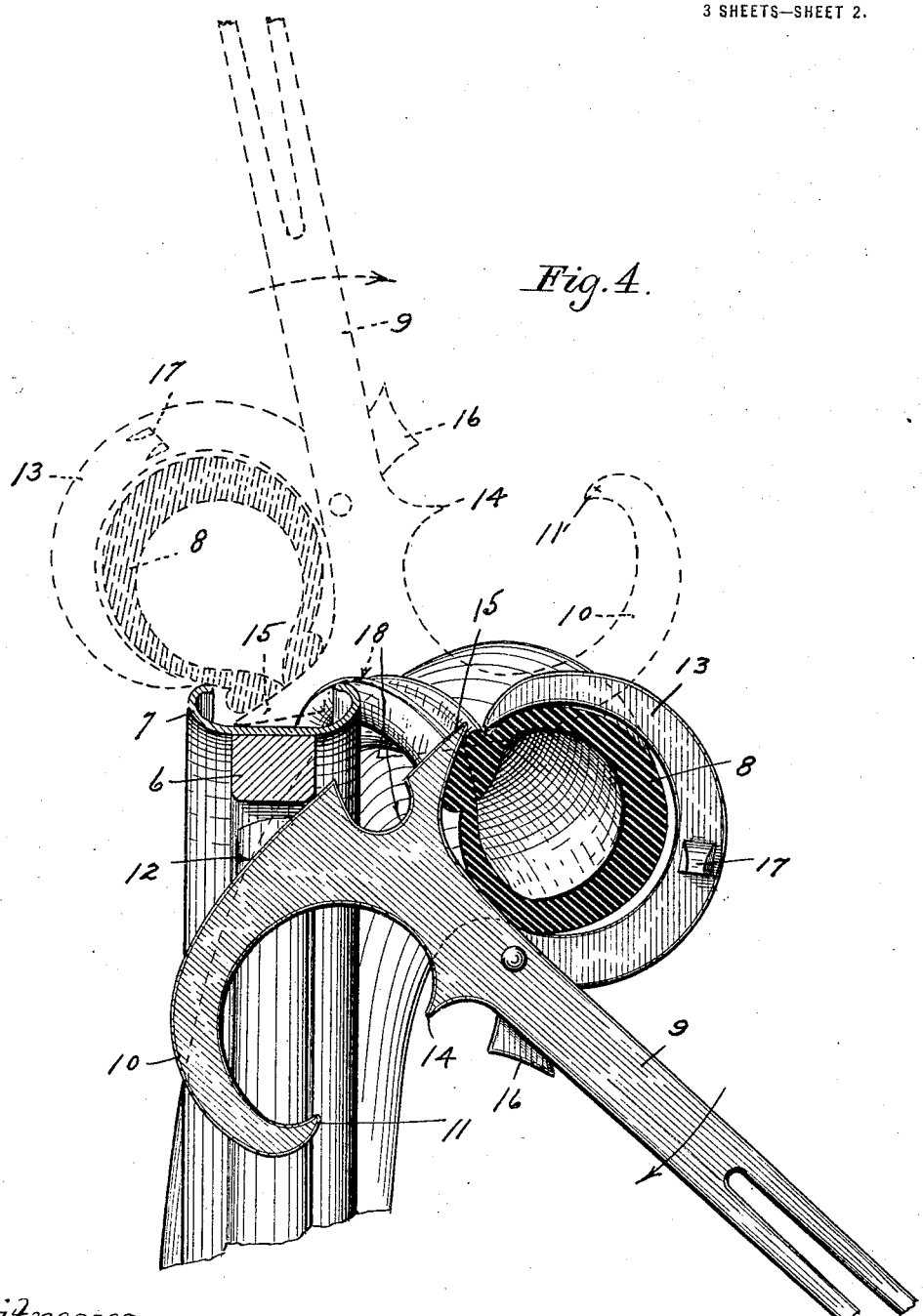
Fig. 4 is a view corresponding to Fig. 3, but illustrating further steps in the removal of the casing from the wheel rim.

Formed in the tool, between the arm 10 and the finger 15, is a notch 18, adapted to straddle one of the circumferential edges of the rim 7 when the tool is used, as shown by dotted lines in Fig. 4, and allows the finger 15 to be used in prying or imparting the initial movement of the casing 8 from the rim 7. This notch 18 also affords a fulcrum that is engageable with the respective edge of the rim 7 when the tool is used in imparting the initial lateral movement of the casing 8 from its dotted line position, as shown in Fig. 4, and before the fulcrum surface 12 is brought into engagement with the respective edge of the rim and felly, to impart a further lateral movement of said casing and carry the same into a position as shown in Fig. 4.

In removing the casing 8 from the rim 7, the first step is to apply the tool, as shown in Fig. 3, in which position the finger 15 and free end of the movable grapple 13 engage opposite sides of the casing 8, just above the circumferential edges of the rim 7. A movement of the lever 9, in the direction of the arrow marked in Fig. 3, will carry the tool and connected portion of the casing into a position as indicated by broken lines in said figure. With both sides of the casing 8 thus lifted, a bar or other suitable tool 19, indicated by broken lines, is inserted between the lifted portion of said casing and the rim 7.

A further step in removing the casing 8 from the rim 7, is to shift the tool to the other side of said rim and insert the finger 15 between the casing and rim, at one side of the tool 19, and with the notch 18 straddling the adjacent edge of said rim, as shown by broken lines in Fig. 4. The lever 9 is then moved, on the fulcrum afforded by the notch 18, in the direction of the arrow marked thereon in Fig. 4. This initial movement of the tool will lift the connected portion of the casing 8 radially out of the rim. A still further movement of the lever 9, on the fulcrum 18, will carry the shifting fulcrum 12, first into engagement with the rim and then into engagement with the felly, the latter position of which is shown by full lines in Fig. 4. During this movement of the lever 9, the finger 15 has pulled the lifted section of the casing laterally from the rim and into a position in which the balance of the casing may be easily removed from the rim by hand.

To replace the casing 8 on the rim 7, said casing is first placed on the rim by hand as far as it will go. The hook 11, on the arm 10, is then interlocked or engaged with one edge of the rim 7 with the casing 8 resting on the upper edge of the lever 9, as shown by full lines in Fig. 5. Then by lifting the lever 9, the casing 8 is forced onto the rim 7. During the initial movement of the lever 9 the casing 8 will slip thereon until the same engages the shoulder 14, which affords a stop on which the said casing is lifted radially onto the rim. During this lifting movement of the lever 9 the outer point of the shoulder 14 just passes the respective side of the felly and rim, and thereby prevents the casing from getting in between the rim and shoulder. As previously stated, this shoulder 14 is used when applying relatively large tires to rims. If a relatively small tire is to be placed on a rim, the movable grapple 13 is lifted until its stop 17 engages the lever 9, which positions the supplemental shoulder 16 with respect to the shoulder 14, and thereby affords a lifting shoulder for the casing which works close to the adjacent side of the relatively small rim. The final lifting movement of the lever 9, will force the casing 8 laterally onto the rim 7, and at the same time, the shoulder 14, or the supplemental shoulder 16, whichever is being used, will move out of engagement with the casing 8, as indicated by broken lines in Fig. 5.

What I claim is:

A tire tool comprising a lever having a fixed arm with a rim-engaging hook at its free end, a fixed tire-engaging shoulder on the lever, an arm pivoted to the lever and having a supplemental tire-engaging heel or shoulder, and a stop for positioning the supplemental heel or shoulder with respect to the fixed arm.

In testimony whereof I affix my signature in presence of two witnesses.

JULIUS BJORNLIE.

Witnesses:
HULDA LIEDER,
HARRY D. KILGORE.

Copies of this patent may be obtained for five cents each, by addressing the "Commissioner of Patents, Washington, D. C."